United States Patent
Zucker

(10) Patent No.: US 7,848,195 B2
(45) Date of Patent: Dec. 7, 2010

(54) METHOD FOR TRANSMITTING A WRITE STRATEGY TO A LASER DRIVER

(75) Inventor: Friedhelm Zucker, Villingen-Schwenningen (DE)

(73) Assignee: Thomson Licensing, Boulogne-Billancourt (FR)

(*) Notice: Subject to any disclaimer, the term of this patent is extended or adjusted under 35 U.S.C. 154(b) by 1046 days.

(21) Appl. No.: 11/545,702

(22) Filed: Oct. 10, 2006

(65) Prior Publication Data

US 2007/0104056 A1    May 10, 2007

(30) Foreign Application Priority Data

Nov. 8, 2005    (EP) .................................. 05110474

(51) Int. Cl.
*G11B 7/00*    (2006.01)
(52) U.S. Cl. ............... 369/47.51; 369/44.13; 369/47.53
(58) Field of Classification Search ........................ None
See application file for complete search history.

(56) References Cited

U.S. PATENT DOCUMENTS

| | | | |
|---|---|---|---|
| 5,179,517 A * | 1/1993 | Sarbin et al. ................... | 463/25 |
| 6,442,118 B1 | 8/2002 | Hoshino et al. | |
| 6,904,406 B2 * | 6/2005 | Yamaji ........................ | 704/501 |
| 7,263,056 B2 * | 8/2007 | Allen ........................ | 369/275.2 |
| 2001/0038694 A1 | 11/2001 | Senshu | |
| 2003/0151994 A1 * | 8/2003 | Tasaka et al. ............. | 369/47.53 |
| 2004/0179451 A1 | 9/2004 | Morishima et al. | |
| 2007/0086287 A1 * | 4/2007 | Kondo ..................... | 369/44.13 |

FOREIGN PATENT DOCUMENTS

| | | |
|---|---|---|
| CN | 1317792 A | 10/2001 |
| EP | 1 484 753 A2 | 12/2004 |

OTHER PUBLICATIONS

Patent Abstracts of Japan vol. No. 2003, No. 12, Dec. 5, 2003 JP 2004 192707 A (Mitsumi Electric Co. Ltd.), Jul. 8, 2004.
Patent Abstracts o Japan vol. No. 2003, No. 12, Dec. 5, 2003 JP 2005 004888 A (Shinano Kenshi Co. Ltd.), Jan. 6, 2005 the whole document.

* cited by examiner

*Primary Examiner*—Van N Chow
(74) *Attorney, Agent, or Firm*—Robert D. Shedd; Robert B. Levy; Jorge Tony Villabon

(57) ABSTRACT

The invention relates to a method for transmitting a write strategy to a laser driver, and to a pickup and an apparatus for writing to or reading from and writing to optical recording media using such method.

According to the invention, the method has the steps of:
  transmitting an encrypted write strategy to the laser driver; and
  decrypting the transmitted write strategy with a decryption key stored in a first memory of the laser driver.

8 Claims, 1 Drawing Sheet

METHOD FOR TRANSMITTING A WRITE STRATEGY TO A LASER DRIVER

This application claims the benefit, under 35 U.S.C. 119, of German patent application no. 05110474.3 filed 08 Nov. 2005.

FIELD OF THE INVENTION

The invention relates to a method for transmitting a write strategy to a laser driver, and to a pickup and an apparatus for writing to or reading from and writing to optical recording media using such method.

BACKGROUND OF THE INVENTION

The number of different CD and DVD recorder applications is growing rapidly. Likewise, the number of media manufacturers and hence the number of different types of optical recording media is constantly increasing. It is to be expected that this situation will be the same for future optical recording formats such as BD (BluRay Disk) or HD-DVD.

The key requirement for any recording apparatus is to write data with at least a specified minimum quality, independent of the type of recording medium and the recording speed. The quality achieved during the writing process is mainly determined by the optical power control unit (OPC) and the so called write strategy used by the recording apparatus for a given optical recording medium. The optical power level is automatically adjusted by the recording apparatus, once for each new recording medium. However, the parameters for the write strategy are usually evaluated manually and determined separately for each type of recording medium and each recording speed, respectively. The parameters of the write strategy describe the shape and timing of the write signal and the write pulses, respectively. Each symbol (pit length) recorded at a certain speed has its own set of write strategy parameters on each recording medium. In total about 50 to 100 parameters need to be determined for each recording medium. The evaluation of the write strategy parameters hence needs a large amount of time and resources. Today the evaluation of the write strategy parameters for one type of recording medium engages one engineer for one day. Due to the time consuming evaluation process the number of recording media, which are supported by a recording apparatus, is limited. Similarly, new types of recording media, which arrive on the market after the development of the recoding apparatus, are not or only badly supported. This leads to customer dissatisfaction. To improve the number of supported recording media a continuously increasing amount of resources is necessary to evaluate new recording media.

Recording on recordable optical disks requires laser pulses at a high frequency. The frequency is higher than the pit frequency, as generally there are several short pulses per pit. For increased writing speeds (2x, 4x, 16x, etc.) the frequency of the laser pulses increases accordingly. This means that very high frequency signals need to be transmitted from a main processor to the laser driver. The transmission is usually performed via a flexi board, which causes problems (e.g. accuracy) for high frequencies. A known approach is to program the write strategy parameters to the pickup, i.e. the laser driver thereon, and to send only the clock and the data stream to the laser driver so that the high frequent pulses do not need to be transmitted over comparatively long flexi board wires. As it is very costly to generate the write strategy database, it is not desirable that the write strategy which is used can easily be detected by tracing the data transmission when programming the write strategy's waveform generator to the optical pickup. Furthermore, it is desirable to ensure that the write strategy programmed to the pickup is really suitable for the specific device, as a write strategy developed for a different device could lead to unreadable optical disks.

SUMMARY OF THE INVENTION

It is an object of the present invention to propose a method for transmitting a write strategy to a laser driver, which overcomes the above drawback, and a pickup adapted to use such a method.

According to the invention, this object is achieved by a method for transmitting a write strategy to a laser driver, having the steps of:
  transmitting an encrypted write strategy to the laser driver; and
  decrypting the transmitted write strategy with a decryption key stored in a first memory of the laser driver.

An optical pickup according to the invention has:
  a laser driver for driving a laser for writing to an optical recording medium;
  a first memory for storing at least one decryption key;
  an input for receiving an encrypted write strategy; and
  a decrypter for decrypting an encrypted write strategy received at the input with a decryption key stored in the first memory.

The invention proposes to provide the laser driver IC with the possibility to load a key, e.g. during manufacturing of the laser driver, the pickup, or the recording device. The write strategies are then sent from a microprocessor to the laser driver encrypted, so that the write strategies cannot be easily traced. A device specific encryption ensures that the write strategies are only usable with the correct device. During transmission of an encrypted write strategy, 'blind' (meaningless) registers or data are advantageously also transmitted to hamper an unauthorized decryption of the write strategy using a probability analysis. The write strategies are either stored encrypted in a memory connected to the microprocessor, or they are stored unencrypted and are only encrypted at the time they are send to the laser driver. The laser driver IC decrypts the write strategies using the stored key. The solution has the advantage that on the one hand no high frequency data transmission occurs, as only the clock and the data stream need to be transmitted to the laser driver. On the other hand the transmitted write strategies are secure from copying and verified for the specific device. Preferably the write strategies stored in the memory connected to the microprocessor are updatable, e.g. from a storage medium on which the encrypted write strategies are stored, such as an optical recording medium read by the optical pickup or a storage card inserted into a storage card reader. The laser driver may also receive an encrypted write strategy directly from such a storage medium without passing through the microprocessor.

The write strategy necessary for a specific recording medium is preferably transmitted to the laser driver at the time it is needed. In this way there is no need to store all supported write strategies on the laser driver. However, it is likewise possible to store the transmitted write strategies in a further memory, either decrypted or encrypted. The further memory may be the same as the memory needed for the key, or any other memory integrated within or connected to the laser driver.

Advantageously, a plurality of decryption keys are stored in the first memory of the laser driver. This allows to encrypt the write strategies with different encryption keys. On the one hand, this is useful in case a decryption key has been hacked.

In this case new write strategies are encrypted with another key, which has not yet been hacked. On the other hand, the use of different decryption keys allows to sell the same laser driver to different manufacturers of optical pickups or drives. Each manufacturer receives information about only one or a small number of encryption keys.

Preferably, at least one decryption key stored in the first memory of the laser driver is updatable. For this purpose an updating unit is provided. As before, this allow to replace a hacked decryption key with a new decryption key. The new decryption key may have an improved security, e.g. a longer key may be employed. Preferentially, a password is needed for updating the at least one decryption key stored in the first memory of the laser driver, to prevent any unauthorized manipulation of the decryption keys. The password is checked by a password control unit.

Advantageously, an apparatus for writing to or reading from and writing to optical recording media includes an optical pickup or means for performing a method according to the invention.

BRIEF DESCRIPTION OF THE DRAWINGS

For a better understanding the invention shall now be explained in more detail in the following description with reference to the figures. It is understood that the invention is not limited to this exemplary embodiment and that specified features can also expediently be combined and/or modified without departing from the scope of the present invention. In the figures.

DETAILED DESCRIPTION OF PREFERRED EMBODIMENTS

Figure 1:
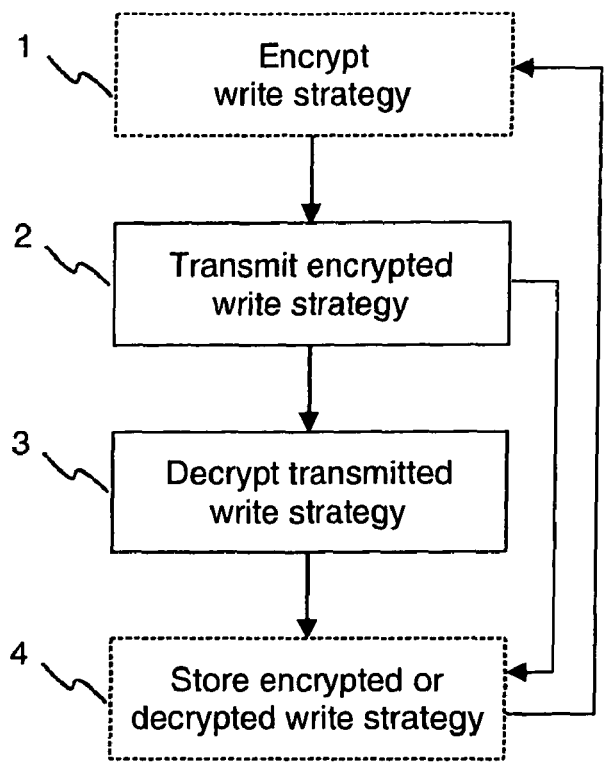
FIG. 1 shows a method according to the invention for transmitting a write strategy to a laser driver.

In FIG. 1, a method according to the invention for transmitting a write strategy to a laser driver is shown. In this figure, optional steps are indicated by hashed boxes. If the write strategy, which is to be transmitted to the laser driver for recording onto a specific recording medium, is not yet encrypted, in a first step 1 the write strategy is encrypted. The encrypted write strategy is then transmitted 2 to an optical pickup, where it is decrypted 3 by a decrypter. Optionally, either the encrypted or the decrypted write strategy is stored 4 in a memory. A further write strategy may then be transmitted by repeating the various steps.

Figure 2:
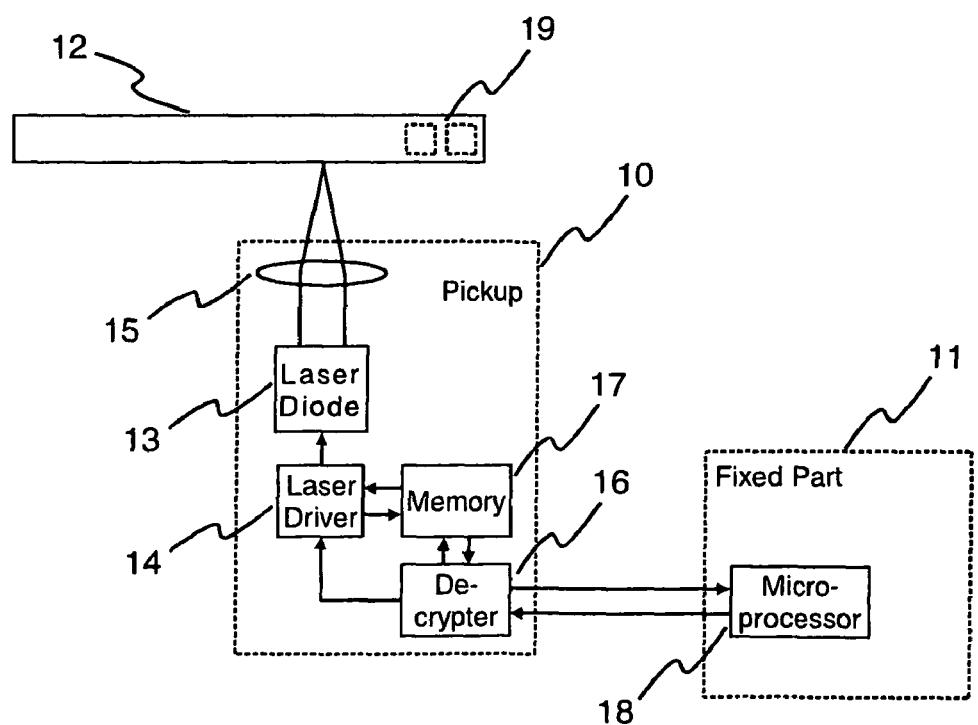
FIG. 2 schematically illustrates an apparatus for writing to optical recording media adapted to use a method according to the invention.

An apparatus for writing to optical recording media, which is adapted to use a method according to the invention, is illustrated schematically in FIG. 2. The apparatus includes a movable optical pickup 10 and a fixed part 11. Located on the fixed part 11 is a microprocessor 18, which besides other functions transmits a necessary write strategy to the optical pickup 10. Situated on the optical pickup 10 are a laser diode 13, which is controlled by a laser driver IC 14. The laser diode 13 emits a light beam, which is focused onto an optical recording medium 12 by an objective lens 15. One or more encrypted write strategies 19 may be stored on the optical recording medium 12. Other elements of the optical pickup are well known to a person skilled in the art and have been omitted for the sake of clarity. Apart from the above elements, the optical pickup 10 further includes a decrypter 16 for decrypting a transmitted encrypted write strategy, and a memory 17 for storing the transmitted write strategies, either encrypted or decrypted. In addition, one or more decryption keys are stored in the memory 17. Though in the figure a single memory 17 is shown, the memories for storing the decryption keys and the write strategies can likewise be different memories. Furthermore, the memory 17 or the memories can also be part of the laser driver IC 14 or of the decrypter 16. The memory 17 may also be located on the fixed part 11. In this case, if write strategies are stored in this memory 17, they should be stored encrypted. Likewise, the decrypter can also be integrated in the laser driver IC 14. When the laser driver 14 needs a write strategy for a specific recording medium 12, it either obtains this write strategy from the memory 17 or from the microprocessor 18. When the write strategies are stored decrypted in the memory 17, the requested write strategy is directly transmitted to the laser driver 14 from the memory 17. When the write strategies are stored encrypted in the memory, the requested write strategy is transmitted from the memory 17 to the laser driver 14 via the decrypter 16. The laser driver IC 14 may also obtain a necessary write strategy from a storage medium on which the encrypted write strategies are stored, either directly or indirectly through the microprocessor 18. The storage medium may be for example the optical recording medium 12 or a storage card inserted into a storage card reader. Such a storage medium can also be used for updating the write strategies stored in a memory of the microprocessor 18 or the decryption keys stored in the memory 17 of the laser driver IC 14.

What is claimed is:

1. A method for transmitting at least a first write strategy and a second write strategy from a microprocessor to a laser driver located on an optical pickup, comprising the steps of:
   transmitting a first encrypted write strategy to the laser driver;
   decrypting the transmitted first encrypted write strategy with a decryption key stored in a first memory connected to the laser driver and located on the optical pickup;
   storing the transmitted first write strategy in a second memory connected to the laser driver and located on the optical pickup either decrypted or encrypted,
   transmitting a second encrypted write strategy to the laser driver;
   decrypting the transmitted second encrypted write strategy with a decryption key stored in the first memory; and
   storing the transmitted second write strategy in the second memory either decrypted or encrypted.

2. The method according to claim 1, wherein a plurality of decryption keys are stored in the first memory.

3. The method according to claim 1, wherein at least one decryption key stored in the first memory is updatable.

4. The method according to claim 3, wherein a password is needed for updating the at least one decryption key stored in the first memory.

5. An apparatus for writing to or reading from and writing to optical recording media adapted to perform a method according to claim 1.

6. An optical pickup, comprising:
   a laser driver for driving a laser for writing to an optical recording medium;
   a first memory connected to the laser driver having stored therein at least one decryption key;
   an input for receiving at least a first and a second encrypted write strategy;
   a decrypter for decrypting an encrypted write strategy received at the input with a decryption key stored in the first memory; and a second memory connected to the laser driver for storing the transmitted first and second write strategies either decrypted or encrypted.

7. The optical pickup according to claim 6, further comprising an updating unit for updating at least one decryption key stored in the first memory.

8. The optical pickup according to clam 7, further comprising a password control unit for restricting the updating of the at least one decryption key stored in the first memory.

\* \* \* \* \*